US00RE34331E

United States Patent [19]

Elings et al.

[11] E Patent Number: Re. 34,331

[45] Reissued Date of Patent: Aug. 3, 1993

[54] FEEDBACK CONTROL FOR SCANNING TUNNEL MICROSCOPES

[75] Inventors: Virgil B. Elings; John A. Gurley, both of Santa Barbara, Calif.

[73] Assignee: Digital Instruments, Inc., Santa Barbara, Calif.

[21] Appl. No.: 761,171

[22] Filed: Aug. 30, 1991

Related U.S. Patent Documents

Reissue of:

[64] Patent No.: 4,889,988
Issued: Dec. 26, 1989
Appl. No.: 215,729
Filed: Jul. 6, 1988

[51] Int. Cl.[5] ..... H01J 37/26

[52] U.S. Cl. ..... 250/306; 250/307

[58] Field of Search ..... 250/306, 307; 73/105

[56] References Cited

U.S. PATENT DOCUMENTS 4,343,993 8/1982 Binnig et al. ..... 250/306
4,889,988 12/1989 Elings et al. ..... 250/306

OTHER PUBLICATIONS

Marti et al., Rev. Sci. Instrum. 59(6), Jun. 1988, pp. 836–839.

*Primary Examiner*—Jack I. Berman
*Attorney, Agent, or Firm*—Oblon, Spivak, McClelland, Maier & Neustadt

[57] ABSTRACT

A feedback control system for enhancing the feedback loop characteristics of a vertical axis control in a scanning tunneling microscope or the like, including a tip member for positioning relative to a surface for measuring the topography of the surface. A horizontal control coupled to the tip for providing a plurality of adjacent horizontal scans across the surface. A vertical control coupled to the tip for providing a vertical control of the tip during the plurality of adjacent horizontal scans. A local error signal produced in accordance with the vertical position of the tip relative to the surface in real time during the plurality of adjacent horizontal scans. A storage member responsive to the local error signal for storing the local error signal for producing a delayed error signal representing the vertical position of the tip relative to the surface at an earlier time, and a vertical tip control signal coupled to the vertical control and formed by combining the local error signal and the delayed error signal for enhancing the control of the vertical position of the tip.

52 Claims, 5 Drawing Sheets

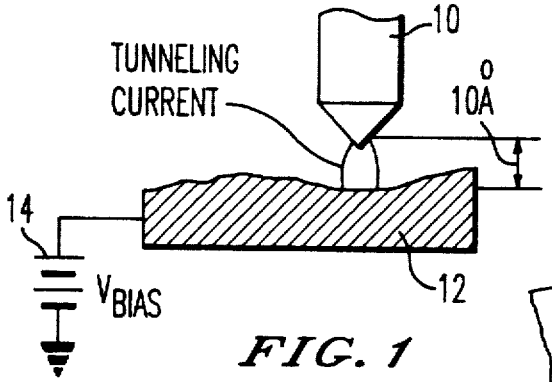
FIG. 1
FIG. 2
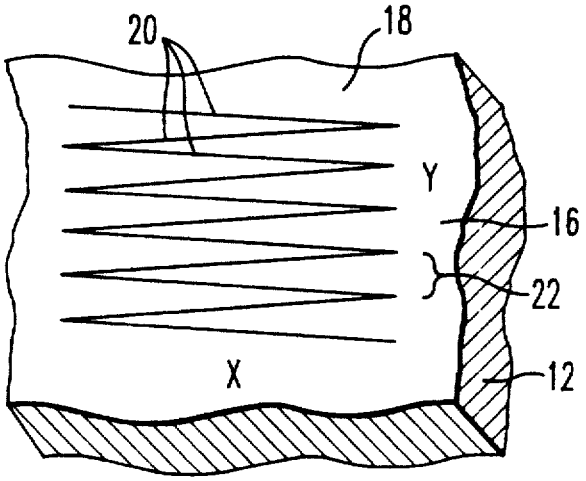
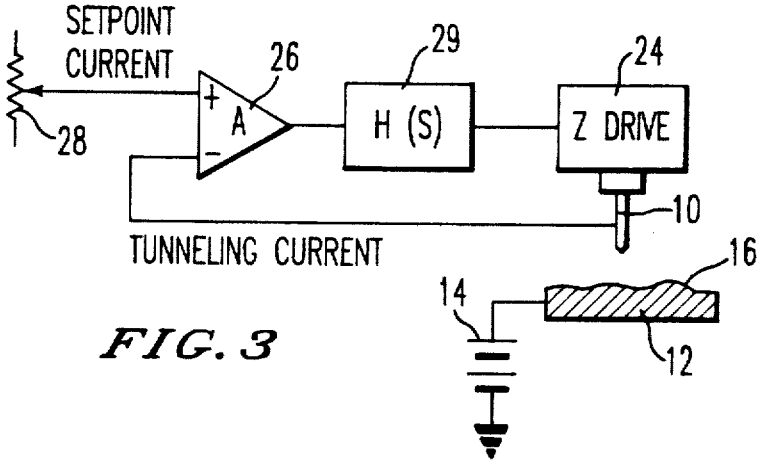
FIG. 3
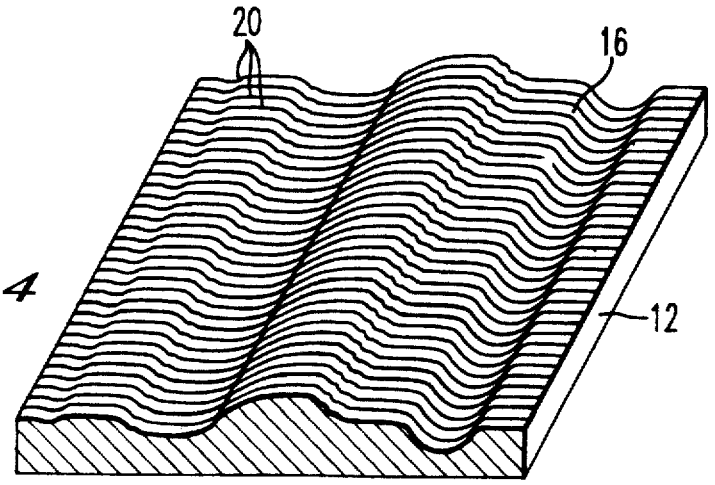
FIG. 4

FEEDBACK CONTROL FOR SCANNING TUNNEL MICROSCOPES

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a feedback control for scanning tunneling microscopes or the like. Specifically, the feedback control of the present invention uses stored topographical information to increase the response of the feedback loop.

2. Description of the Prior Art

In a typical scanning tunneling microscope, a conducting tip is positioned an atomic distance such as 2 to 3 atoms above the surface of a sample. The sample is typically a conductor or a semiconductor. This distance of 2 to 3 atoms is approximately ten angstroms (10 Å). A current which is referred to as the tunneling current may then be made to flow between the sample and the tip. This tunneling current is due to a bias voltage applied between the sample and the tip.

The tip is typically scanned over the surface of the sample using a raster scan formed by a plurality of adjacent horizontal scan lines and with a feedback loop positioning the vertical position of the tip. Specifically, the vertical position of the tip is controlled so that the tunneling current is held to a constant value. The vertical position of the tip is normally controlled by a piezoelectric element. In particular, the tip is mounted on the piezoelectric element and by applying positive and negative voltages to the piezoelectric element, the element expands or contracts to thereby lower or raise the tip relative to the sample. The maintaining of a constant tunneling current through the use of the feedback loop thereby gives a constant height of the tip above the surface.

The maintaining of the constant tunneling current is accomplished through the positive or negative voltage applied to the piezo element which voltage may be referred to as a positioning voltage. Therefore, by monitoring the positioning voltage which is applied to the vertical positioning piezo element, the vertical position of the tip can be recorded since it is related to the positioning voltage. In this way, the vertical position of the tip is recorded as the tip is scanned along the surface to provide a record of the vertical position of the sample surface as a function of the horizontal position of the tip relative to the sample. The horizontal coordinates of the tip are normally referred to as X and Y, and the vertical position is referred to as Z. It is, therefore, possible to get a record of the topography of the surface by monitoring the X and Y position of the scanning of the tip and at the same time monitoring the Z position of the height of the tip.

It is very important for all scanning tunneling microscopes that the feedback loop controlling the Z position of the tip relative to the sample be very precise. This is because the current that flows between the sample and the tip occurs only when the tip is about ten angstroms (10 Å) from the surface. As the tip is moved away from the surface, the tunneling current falls off exponentially and can drop by a factor such as five (5) as the tip is moved a very short distance such as five or more angstroms (5 Å) from the surface. Normally, a scanning tunneling microscope cannot be operated with the tip much further away from the surface than twenty angstroms (20 Å) because at the time, the tunneling current becomes too small to measure.

It can be seen, therefore, that the vertical position of the tip must be precisely controlled with the tip very close to the surface. In one direction, the control must be very close, but without hitting the tip on the surface, or as indicated above, without the tip getting so far from the surface that the tunneling current drops to an immeasurable level. In order to accomplish this and thereby map the topography of a sample with the scanning tunneling microscope, the feedback loop controlling the vertical position of the tip must be both precise and fast, but without causing oscillation. It is also desirable that the scanning of the samples be with scans of relatively large dimensions. If these larger scans are to be performed in the same time period, then the feedback loop must be faster in order to follow the topography. If this cannot be accomplished, then the scan rate must be slowed down in order to provide for the larger scans, but this is undesirable since the scan would, therefore, take considerably greater periods of time. In general, the faster the scan rate, the better.

The newer scanning tunneling microscopes allow for relatively large scans such as nine microns by nine microns. It is desirable to provide for such large scans within reasonably short periods of time such as under one minute. In order to accomplish this, the required scan rate would be very difficult to achieve and still have the tip follow the surface with the required accuracy.

[In general, most scanning] *Scanning* tunneling microscopes that are in the prior art use an analog feedback loop for the loop controlling the vertical position of tip. In such an analog signal, an error signal is produced which is the difference between a set point current and the actual tunneling current flowing between the sample and the tip. This error signal is used in the feedback loop to change the position of the tip to current the value of the tunneling current back to the set point value as the tip is scanned across the surface. As an example, if the tip moved too close to the surface, the tunneling current will have a value above the set point value and the feedback loop will receive an error signal reflective of the difference, amplify the error signal and apply it to the vertical drive element with the proper polarity to raise the tip from the surface. When the tip is raised from the surface, this in turn lowers the value of the tunneling current back to the set point value.

The type of feedback generally used in prior art scanning tunneling microscopes is both integral and proportional. The integral portion of the feedback keeps the average error always zero, but tends to slow down the response of the feedback loop since integrators smooth out rapid variations in the error signal. Additionally, the use of an integrator produces a phase shift of 90° which is somewhat detrimental in the feedback loop. For example, it can be seen that if the phase shift [where] *were* 180°, the tip would be completely out of phase with the tunneling current and the feedback would drive the tip in the direction opposite to that required to correct the error and the loop would oscillate.

Although a 90° phase shift is not that extreme, it does produce a detriment in the feedback loop. In addition, if there if is a sinusoidal variation in the error signal due to a sinusoidal surface for the sample, then is it necessary to provide a sinusoidal variation of the vertical tip position to correct the error signal. Phase shifts in the feedback loop and in particular 180° phase shifts can have the tip driven in the wrong direction and with the whole feedback oscillating. As a further requirement for stable operation of the feedback loop, the gain of the feedback loop must be kept down to a reasonable level.

In order to mitigate the above described problems in prior art feedback loops, these prior art feedback loops include proportional feedback in which the error signal itself is used in addition to the integrated error in the feedback loop. For example, if there is an error in the tunneling current, this error is amplified and also applied to the positioning of the tip. This proportional feedback has the advantage that there is no inherent phase shift associated with it and, therefore, the feedback loop is less sensitive t the accumulation of phase shifts from the other parts of the feedback loop such as the filters, amplifiers and tip drive elements. The use of proportional feedback also gives a higher frequency response than the integral feedback.

The different forms of feedback described above are used in prior art scanning tunneling microscopes to form a local error signal in the feedback loop. Specifically the error signal measured at the present horizontal position of the tip is used to control the vertical position of the tip at essentially that same horizontal position so as to maintain the constant tunneling current. If the topography of the sample is very steep, then the local error signal becomes large and unless the gain of the feedback loop is very high, the vertical position of the tip may not be corrected fast enough and the tip would thereby run into the surface. This condition obviously must be avoided. If the tip runs into the surface of the sample, this will completely upset the feedback loop and result in an improper image.

[So far an analog feedback loop has been described, but it is to be appreciated that the feedback loop may also be formed as a digital feedback loop. In such a digital feedback loop, the tunneling current between the sample and the tip is digitized and entered into a computer where the digital value of the tunneling current is compared with a preset value to calculate what the vertical position of the tip would be in order make the error signal become zero. One advantage of the use of a digital feedback is that digital processing may now be available. With such digital processing, any function of the error signal can be applied within the feedback loop. For example, it is possible with a digital feedback loop to use, in addition to the integral and proportional feedback, other forms of feedback such as differential feedback. In general, however, the use of a digital feedback loop has accomplished the same general results as the prior art analog feedback loops, except that the integrators and amplifiers that are found in analog feedback loops are replaced by numerical calculations in the computer.

Basically, both analog and digital] *Prior Art* feedback loops for scanning tunneling microscopes [both] have the [common] problem of requiring the feedback loop to have a high frequency response in order to provide for accurate tracking of the sample surface. In addition, any phase delays may lead to instabilities in the feedback response especially at high frequencies and when the gain is high. All of these problems have limited the use of scanning tunneling microscopes and specifically, have required relatively slow scan rates in order to provide for image enhancement. In particular this is true when the size of the scans are made larger and where it is desired to accomplish these larger scans in a reasonable period of time. It is, therefore, desirable to provide for improvements in the feedback control for scanning tunneling microscopes to overcome a number of the problems described above in the prior art devices.

SUMMARY OF THE PRESENT INVENTION

The present invention provides for improvements in the feedback control for scanning tunneling microscopes by *using digital feedback instead of analog feedback, and in one embodiment, by* specifically using prior recorded topographical information to increase the response of the feedback loop. This improved feedback response leads to a more accurate rendering of the topography of the object under investigation by the scanning tunneling microscope. *In the digital feedback loop of the present invention, the tunneling current between the sample and the tip is digitized and entered into a computer where the digital value of the tunneling current is compared with a preset value to calculate what the vertical position of the tip should be in order make the error signal become zero. One advantage of the use of a digital feedback is that digital processing may now be available. With such digital processing. any function of the error signal can be applied within the feedback loop. For example, it is possible with a digital feedback loop to use, in addition to the integral and proportional feedback, other forms of feedback such as differential feedback. Further, the digital feedback loop of the present invention permits using prior recorded topographical information to increase the response of the feedback loop.* It also to be appreciated the same advantages provided by the present invention in scanning tunneling microscopes may also be provided in other devices such as atomic force microscopes.

The present invention provides for improvements by taking advantage of the already existing XY raster scan of the scanning tunneling microscope. Specifically, in a typical case, a scan along the X direction is provided and then the Y direction is changed incrementally and followed with another scan in the X direction. This continues until a typical picture or image is constructed from several hundred of these X direction scan lines and with each X scan line incremented slightly in the Y direction. It can be appreciated, that because of this, each scan line is topographically very similar to its neighbor and with a plurality of successive scan lines being similar to each other and with adjacent scan lines being very similar to each other.

In the present invention, the feedback loop not only uses data from the present position of the tip, which is the local error signal, but also the feedback loop incorporates stored information about the topography near the present position to help position the tip in the vertical direction. The use of the information from the adjacent scan lines, therefore, allows the feedback circuit to anticipate the topography and, therefore, to react much quicker than possible when using only local error information. At a minimum, the feedback loop of the present invention *is digital. In a preferred embodiment it* uses the local error information, plus the information from at least the previous scan line, but it to be appreciated that information from a number of previous scan lines, or from all previous scan lines can be used. The present inventions helps the vertical control to anticipate and thereby, in a sense, to look ahead to improve not only the scan rates, but also to enhance the image capability of the scanning tunneling microscope. The present invention may be implemented in a number of ways and as an example, two implementations are described showing the invention using data from previous scan lines to augment the feedback for the present line. A third implementation is described which employs the information from the previous frame so as to provide enhanced imaging for successive frames. The two implementations which augment the feedback from previous scan lines are generally referred to as scan hysteresis and gain hysteresis. Scan hysteresis uses previous scan line information to directly modify the current scan line Z values. Gain hystersis uses previous scan line information to adjust the gains of the feedback elements operating on the current scan line. These and other details of the invention will be described with reference to the following description and drawings.

BRIEF DESCRIPTION OF THE DRAWINGS

FIG. 1 illustrates the operation of a scanning tunneling microscope;

FIG. 2 illustrates the raster scanning of the tip of a scanning tunneling microscope;

FIG. 3 illustrates a prior art feedback control;

FIG. 4 illustrates the image produced of the surface topography by a scanning tunneling microscope;

DETAILED DESCRIPTION OF THE PREFERRED EMBODIMENT

Figure 5:
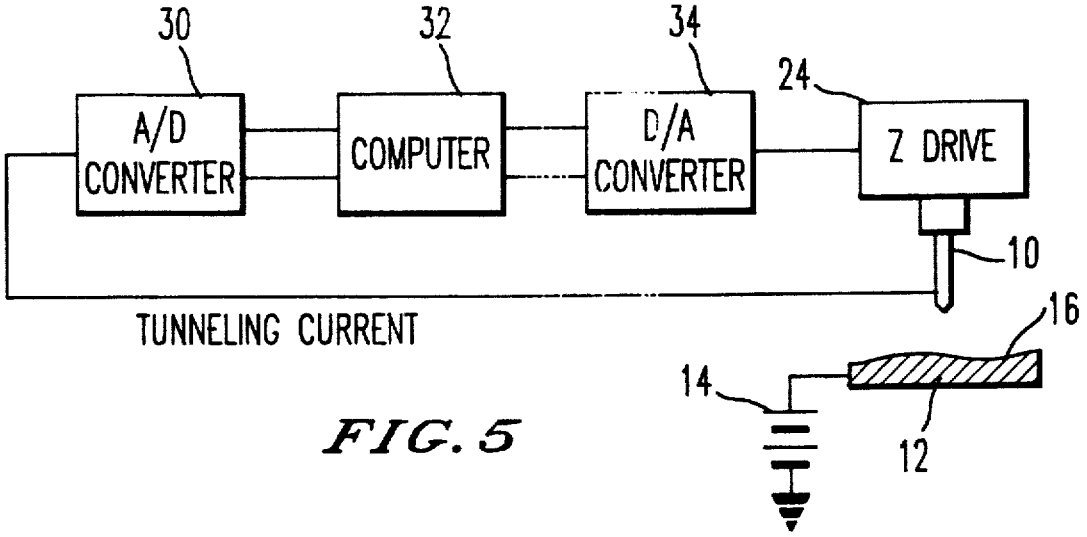
FIG. 5 illustrates a digitized feedback control without any previous line or previous frame enhancement.

As shown in FIG. 1, a scanning tunneling microscope includes, a conducting tip 10 held approximately ten angstroms (10 Å) above the surface of a sample 12. The sample is typically a conductor or a semiconductor. A tunneling current flows between the sample 12 and the tip 10 due to a bias voltage 14 applied between the sample 12 and the tip 10.

As shown in FIG. 2, the tip 10 is scanned over a surface 16 of the sample 12 in a raster fashion as shown by the raster scan 18. The raster scan 18 is provided by a series of horizontal scan lines 20 in an X direction with each adjacent horizontal scan line incremented in a Y direction with a Y incremental distance as shown by distance 22. In the prior art as shown in FIG. 3, a feedback control positions the vertical position of the tip 10 such that the tunneling current is held constant. Typically, the vertical position of the tip 10 is controlled by a piezoelectric element 24, which produces a Z drive, or a raising or lowering of the tip 10 relative to the sample 12. Specifically, by applying positive or negative voltages to the piezoelectric element 24, the element expands or contracts to thereby lower or raise the tip relative to the sample.

The tunneling current is applied to a differential amplifier 26 which also receives a set point current produced from a potentiometer 28 as shown in FIG. 3. The output of the differential amplifier 26 is the error signal. It can be seen, therefore, that if the tunneling current is equal to the set point current, then the error signal would be zero. However, any inaccuracy in the position of the tip produces a change in the tunneling current which in turn produces a difference between the tunneling current and the set point current and thereby an error signal from the amplifier 26. The error signal may then be applied to a function generator 29 which modifies the properties of the error signal from the amplifier 26.

As described above, the error may be modified such as by integration or proportionality in order to enhance the error correction and provide for this enhancement with a stable operation of the feedback loop. In any event, the error signal as modified by the function generator 29 is applied to the Z drive 24 to change the position of the tip 10 to correct the tunneling current back to the set point as the tip is scanned across the surface 16 of the sample 12. Maintaining a constant current with the feedback loop produces a constant height of the tip 10 above the surface 16. The positioning voltage for the Z drive 24, therefore, provides for a record of the vertical position of the surface 16 as a function of the X and Y positions provided by the scanning. Therefore, the record of the vertical position of the tip, as reflected by the positioning voltage applied to the Z drive 24, is a record of the topography of the surface. As an example the surface 16 of the sample 12 is shown in more detail in FIG. 4 and is shown to be defined by the plurality of scan lines 20 in the X direction and with each scan line separated by a Y increment 22 and having vertical positions Z.

As shown in FIG. 5, [it is also possible to provide for] the feedback control *of the present invention is implemented* using a digital feedback. Specifically, the tunneling current between the sample 12 and the tip 10 is digitized by an A/D converter 30. A digitized tunneling current is then applied to a computer 32 and with the computer 32 including information relative to a desired digitized value of the tunneling current. The computer 32 then calculates what the vertical position of the tip should be in order to make the error signal become zero. This calculation is supplied via a D/A converter 34 to produce the proper vertical positioning signal for the Z drive 24.

Figure 6:
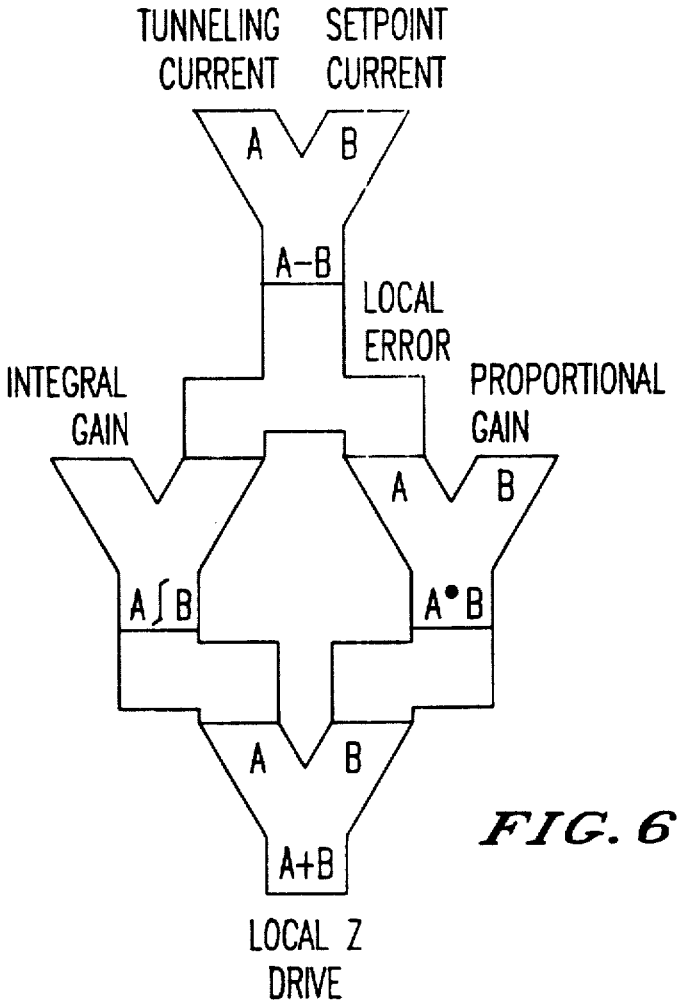
FIG. 6 illustrates a number of calculations that may be provided by the computer forming part of the feedback control in FIG. 5.

As indicated above, using digital feedback allows the use of digital processing and any function of the error signal can be applied within the computer. Specifically, integral, proportional and differential feedback may be accomplished more simply with digital feedback as opposed to analog feedback. [However, a digital feedback control as shown in FIG. 5 merely replaces the integrators and amplifiers of an analog feedback loop by numerical calculations and although the digital feedback has advantages, these advantages are primarily in the ability to provide enhanced digital processing] Specifically, as shown in FIG. 6 various numerical calculations may be provided in the computer for the original digitized signal representing the tunneling current and an internal stored digital value representing the set point current. [The present invention may be more easily implemented using a digital feedback control, but it is to be appreciated that the present invention may be accomplished using analog feedback control.]

Figure 7:
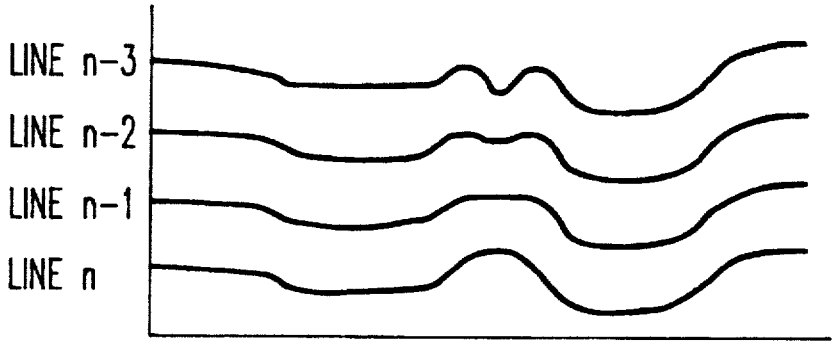
FIG. 7 illustrates a plurality of adjacent scan lines.
Figure 8:
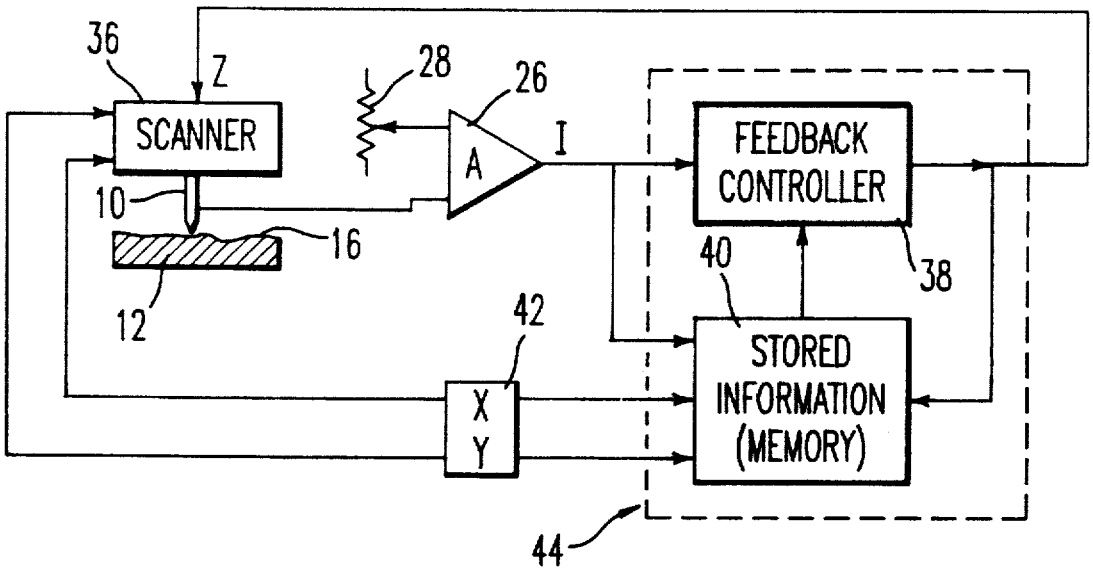
FIG. 8 is a general block diagram showing the use of stored topographical information enhancement to the feedback control of the present invention.

Specifically, the present invention takes advantage of the XY raster scan of the scanning tunneling microscope. As shown in FIG. 7, a plurality of typical adjacent scan lines is shown and identified as line n, n-1, n-2 and n-3. It is to be appreciated that a typical image is produced from several hundreds of these scan lines incrementing slightly in the Y direction for each adjacent line. However, as shown in FIG. 7, each adjacent scan line is topographically similar to its neighbors and very similar to the adjacent scan line. The present invention, therefore, provides for a feedback control which uses data not only from the present position of the scanning tip, but also uses stored information about the topography near the present position to help position the tip in the vertical direction. The present invention, therefore, allows the feedback circuit to anticipate the topography and to react much quicker using the stored data than if the feedback used only local error signal information. FIG. 8 illustrates in general the feedback control of the present invention.

As shown in FIG. 8, a full scanner 36 controls the XY and Z positions of the tip 10 scanned over the surface 16 of the sample 12 to measure the topography. The scanner 36, therefore, provides for the movement of the tip 10 in both the X and Y direction and also incorporates the Z drive 24 shown in FIGS. 3 and 5. FIG. 8 illustrates a scanning tunneling microscope, but it is to be appreciated that an atomic force microscope may also incorporate the advantages of the present invention. For each XY position of the tip 10, a local error signal (I), formed in a manner described before, is fed into a feedback controller 38. [It is to be appreciated that the circuit or even a computer performing feedback calcu feedback controller can be either an analog or a digital lations.] The feedback controller 38 also receives topographical information previously stored in [an analog or] *a* digital memory 40.

Simultaneously to the feedback controller 38 receiving both error and topographical information, the memory 40 is loaded with topographical information from the output of the feedback controller 38 as well as tunneling current information represented by the local error signal (I) and with information corresponding to the present tip XY position in accordance with an XY controller 42. The XY coordinates for the tip 10 may be used to calculate the memory address for the memory 40 so that the present topographical information is stored for future use by the feedback circuit and specifically the feedback controller 38. Alternately, the address information may be implicit if the memory is a first in, first out type f memory. As an example, a first in, first out memory exactly one scan line long will present output information delayed by exactly one scan line. Such a memory would not require X or Y information to provide for address calculations.

As indicated above, the memory could be limited to only the previous scan line and to only the local error signal (I) and/or Z data position of that line. However, it is to be appreciated that the memory 40 could contain data from all previous scanning. The exact portion of the store data which is used in the feedback controller and thereby in the feedback loop for any XY position may be programmed in the feedback controller if the system is digital[, or could be hardwired if the system is analog]. As indicated above, in the minimal situation the memory 40 stores data from at least the previous scan line. It could be seen, therefore, that the portion 44 of the system of FIG. 8 provides for the feedback loop to enhance the Z position control signal by information from at least the previous scan line and if desired from one or more of the previous scan lines or even the complete previous scan information.

Figure 9:
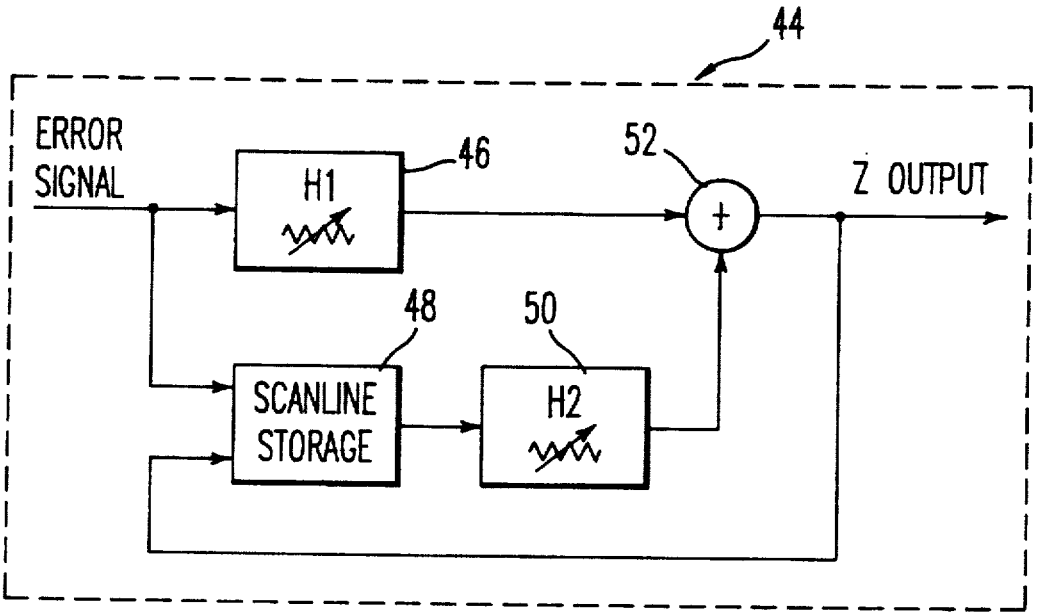
FIG. 9 illustrates a scan hysteresis implementation of the present invention.

FIG. 9 illustrates a specific embodiment of the present invention which may be referred to as scan hystersis and which uses previous scan line information to directly modify the current scan line Z position values. As shown in FIG. 9, the portion 44 of the overall device shown in FIG. 8 is illustrated in greater detail. The scan hysteresis system of FIG. 8 incorporates a transfer function generator 46, represented by H1, which is a [conventional] scanning tunneling microscope feedback generator composed of finite impulse response filters, infinite impulse response filters, plus non-linear elements such as linear/log converters, etc. In the simplest case H1 is an integrator with adjustable gain. The adjustable gain is represented within the box 46 and is usually provided either by the operator or by an automatic control system. The *individual functions performed by the* H1 function generator identified by the box 46 [is] *are* of a conventional type and the details of this device are, therefore, well known to users of scanning tunneling microscopes.

The input to the function generator H1 is the local error signal (I) previously described and [with] the local error signal also applied to a scanline storage memory 48. Although the scanline storage memory 48 could store a number of previous scan lines, for illustration the scanline storage memory 48 is shown to store only the immediately adjacent scanline. The output from the scanline storage memory 48 is applied to a second function generator H2 represented by the box 50. Specifically, the function generator H2 provides a transfer function which converts previous or delayed scanline data into a Z term which is added directly to the Z output. Specifically, a summer 52 sums the information from the function generators H1 and H2 and with the sum of this information provided as the Z output to control the Z position of the scanning tip.

The function generator H2 actually filters a combination of the previous or delayed scanline error signal and the Z output from the summer 52. This can be seen since the output from the summer 52 is also applied as an input to the scanline storage memory 48. It should be also noted that the scan line storage memory 48 may combine the local error signal and Z data on other than a one to one basis. For example, the combining of the Z data and the error signal data may involve non-linear operations such as linear to log conversion. In addition, the Z and error signal data may be deliberately shifted relative to each other prior to being combined [within the scanline storage memory 48]. In any event, the overall specific effect of the scan hysteresis system shown in FIG. 9 is specifically to raise the present vertical position of the tip where the previous scan line was high and to lower the present vertical position of the tip where the previous scan line was low. This therefore uses the previous scan line information to anticipate the desired present vertical position and gives improved response to the feedback loop without introducing instability.

As indicated above, the scan hysteresis system shown in FIG. 9 may be implemented using digital techniques with a significant improvement in the feedback response. For example, function generator H2 may add from the previous scan line a term proportional to the Z point directly opposite the Z point being presently computed. In this way, the following function may be provided.

$$Z(ij)=H1+K.Z(ij-1)$$

Where i and j are the present tip position in X and Y respectively and K is the gain perameter.

Figure 10:
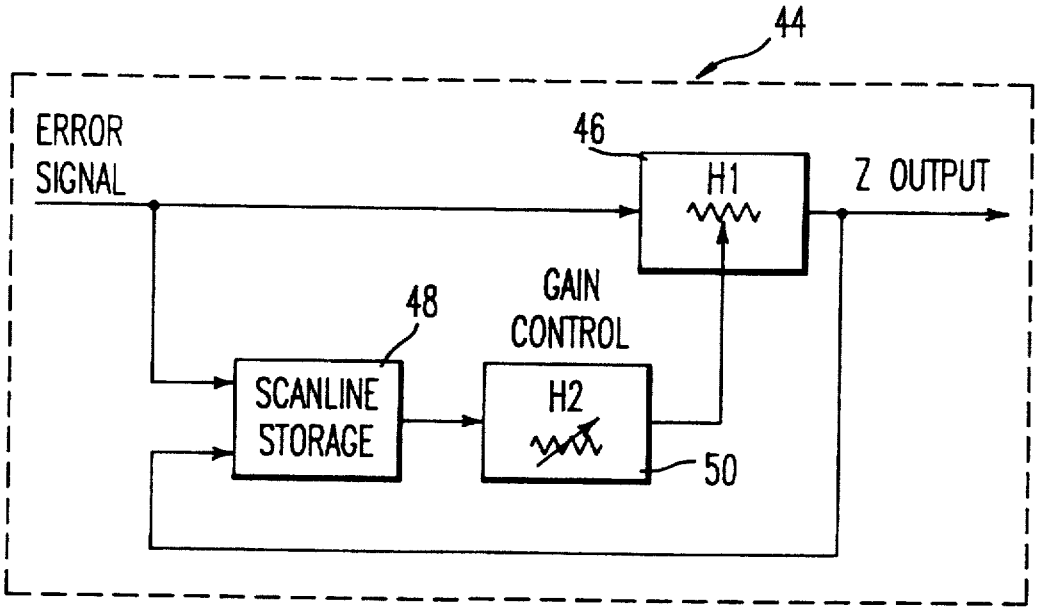
FIG. 10 illustrates a gain hysteresis implementation of the present invention.

FIG. 10 illustrates an embodiment of the invention providing for gain hysteresis. Again for FIG. 10, what is contained within dotted portion 44 may be substituted for the similar portion in FIG. 8. In the system of FIG. 10, the gain of the feedback loop is a function of the Z and error signal data from previous scan lines. As specifically shown in FIG. 10, the function generator H2 represented by the block 50 uses previous or delayed scan line error signal data and Z data provided by the scan line storage memory 48 to modify the gain of the function generator H1 represented by the block 46. The function generators H1 and H2 have structures similar to those described previously.

In one specific implementation of the gain hysteresis embodiment of FIG. 10, the function generator H1 uses the magnitude of the slope of the previous scanline Z data to modify the gain of the function generator H1. Specifically, when the magnitude of the slope is large, the gain of the function generator H1 is increased. Where the magnitude of the slope of the previous scan line is small, the gain of function generator H1 is decreased. Controlling the gain in this matter provides high gain only where it is needed, such as on steep slopes and low gain elsewhere. The knowledge of the slope of the topography comes from the stored data in the memory 48 from the previous line and the stored data from the previous line thereby is used to anticipate the gain necessary to control the Z position for the present line.

It is to be appreciated that the gain hysteresis system of FIG. 10 may also be implemented to have the function generator H2 use the magnitude of the error signal of a previous scanline or lines to modify the gain of the function generator H1. Specifically, the delayed error signal may be filtered by the function generator 50 to remove high frequencies and with the magnitude of the filter error signal then used to adjust the gain of the function generator H1. When the previous scanline error signal is large, the gain is increased. When the error previous scanline signal is small, the gain is decreased. Therefore, gain is added only where a large error signal from previous data indicates that it is needed. Again, it can be seen that the information from the previous scanline may be used to enhance the feedback control of the present scan line.

The previous embodiments of the invention have been described generally with reference to the use of a previous scanline or perhaps a number of previous scanlines to enhance the responsive feedback loop to provide for a more accurate rendering of the topography of the sample. However, it is possible to use data from a previous completed frame or image as part of the feedback. Specifically, with a scanning tunneling microscope, complete surface images are acquired periodically and for example, on large scans a complete surface image may be acquired every thirty seconds. If the image picture is stable and is not drifting from picture to picture, then it is possible to actually look ahead at the topography based on the previous information.

Figure 11:
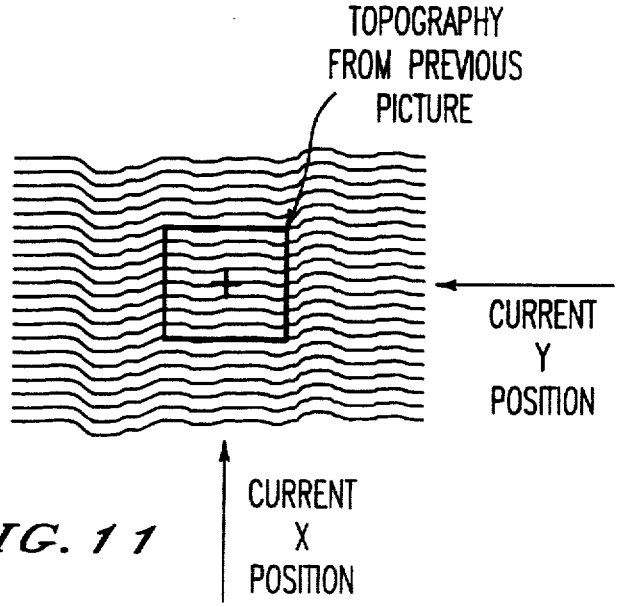
FIG. 11 illustrates the use of a previous scan frame to anticipate the upcoming topography of a current position.

Therefore, it is possible that topography ahead of the present position may be anticipated by the topography of the previous or present position. For example, the control of the vertical tip position can anticipate the upcoming topography using an area surrounding the current position from the previous scan picture. This is shown in FIG. 11. Although, as indicated above, this anticipation would depend on the picture not drifting picture to picture, the current image information could be compared with the stored information in order to calculate the rate of drift so that the scanning system could compensate for the drift. Specifically, the actual Y scanning may be offset in the computer so as to cancel the drift and to yield highly repeatable images of the surface from picture to picture. In this situation, the feedback control 38 shown in FIG. 8 can look ahead at the topographical information on the previous picture and anticipate what the topography is and adjust the vertical position of the tip accordingly.

As the scanning continues from frame to frame or image to image, the topography becomes more determined on each scan and the feedback becomes more precise on each scan. Therefore, the use of the information from the complete previous scan could be used to enhance the topography ahead of the present position, or to enhance the scan of the present position by scanning the same position a number of times and each time providing a more precise image of the surface.

Figure 12:
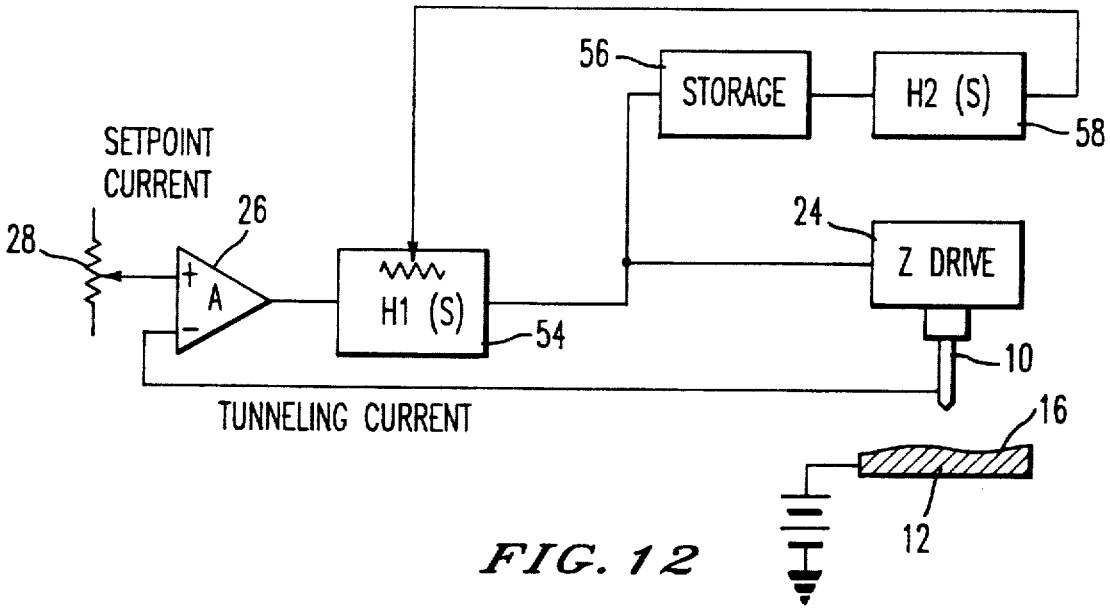
FIG. 12 illustrates an analog implementation of the present invention.

Although the typical implementation of the present invention would use digital techniques, it is to be appreciated that *at least theoretically* the invention may also be implemented using analog techniques. For example, an analog implementation is shown in FIG. 12. The data and analog feedback control, such as shown in FIG. 3, may be implemented by a further feedback loop which adds additional information from the previous line. Specifically, the output of a function generator 58 is used to control the gain of a function generator 54. The storage device 56 which stores one or more previous scan lines, supplied previous data to the function generator 58. The analog storage device 56 may be a charge coupled device or a delay line, or some other form of storage memory. Further signal processing, such as through the function generator 58, may be incorporated in this additional feedback loop and with the output of the function generator 58 being provided as a gain control to the function generator 54. The control signal for the Z drive 24 is, therefore, in accordance not only with the local error signal for the present position, but also in accordance with information from previous scan lines stored by the storage device 56. The information provided by the additional feedback, therefore, would enhance the normal analog feedback loop to help the tip follow the topography better than with the standard integral, proportional or differential analog feedback loop.

In general, it can be seen that the enhanced feedback control of the present invention takes information from stored previous knowledge of the scan of the sample and specifically, information regarding the previous knowledge of the topography of the sample, and includes that information as part of the feedback control loop for the scan tip so that the tip can better follow the surface topography at each present location. Anticipating the topography thereby allows the system to provide a better following of the topography by not relying solely on the local error signal to adjust or change the height of the tip. The anticipation thereby uses the stored topographical information to increase the response of the feedback loop and also to provide for a more accurate rendering of the topography of the object under investigation by the scanning tunneling microscope.

As indicated previously, the present invention may be used not only to enhance the operation of the scanning tunneling microscope, but also to enhance the operation of other types of devices, such as an atomic force microscope. This type of device is similar to the scanning tunneling microscope, but in the atomic force microscope a diamond tip or other sharp hard tip, is physically run across the topography of the sample and with a device such as a piezoelectric device used to make sure that the force of the tip against to surface is held constant.

Specifically, the force is generally a very small force and in a typical case, a diamond tip is held on a cantilever beam with the cantilever beam connected to a piezo electric device. The tip is then brought down onto the surface with a constant force, which force is provided by the bending of the cantilever beam as the tip hits the surface. As the diamond tip follows the topography and the cantilever beam starts to bend either up or down a small amount, this is detected by means such as tunneling or the deflection of a light beam to produce an error signal which in turn used to control a feedback loop to change the piezoelectric device to maintain the force of contact constant. The feedback loop for such an atomic force microscope could thereby include the feedback control enhancement of the present invention.

In all of the above embodiments, it is assumed that the sample is horizontal, the tip is scanned horizontally, and the feedback loop controls the tip motion vertically. It is to be appreciated that these orientations [ar] *are* arbitrary, and that the sample could be orientated vertically with the feedback loop acting horizontally, or other orientation. Also it should be appreciated that the sample could be scanned and moved vertically instead of the tip.

Although the invention has been described with reference to particular embodiments, it is to be appreciated that various adaptations and modifications may be made and the invention is only to be limited by the appended claims.

We claim:

1. A feedback loop system to control a relative vertical position of a tip to a surface of a sample and with the tip or sample scanned in a horizontal plane relative to the surface to measure the topography of the surface, including first means coupled to the tip or sample for providing relative scanning of the tip across the surface in a horizontal plane along a plurality of adjacent scanning lines, second means coupled to the tip and the surface for producing output signals in accordance with the relative vertical position between the tip and the surface at individual positions along the plurality of adjacent scanning lines, [the] the third means responsive to the output signals from the second *means for producing control signals to control* the vertical position of the tip or sample at individual positions, fourth means coupled to one or both of the second and third means, for storing signals from these means at individual locations for later retrieval of these stored signals and with the third means responsive to the output signals from the second means and the previously stored signals from the fourth means for producing control signals representing the vertical position of the tip or sample at individual positions, and fifth means coupled to the tip or sample and the third means and responsive to the control signals to control the tip or sample in accordance with the control signals to a predetermined vertical position.

2. The feedback loop system of claim 1 wherein the first means includes means for scanning along the plurality of adjacent scanning lines to produce a succession of frames of the topography of the surface and including means for forming the control signals by the output signals from the second means and the previously stored signals from the third means from the same frame as the output signals from the second means.

3. The feedback loop system of claim 2 including means for forming the control signals by the output signals from the second means at the individual positions along each adjacent scan line and the previously stored signals from the fourth means at the individual positions from the prior adjacent scan line.

4. The feedback loop system of claim 1 wherein the first means includes means for scanning along the plurality of adjacent scanning lines to produce a succession of frames of the topography of the surface and including means for providing control signals formed by the output signals from the second means from one frame and the previously stored signals from the fourth means from a previous frame.

5. The feedback loop system of claim 1 including means for modifying the output signals from the second means by the previously stores signals from the fourth means to anticipate the topography of the surface to enhance the control of the tip by the control signals to the predetermined vertical position.

6. The feedback loop system of claim 5 including means for generating signals of the third means by applying a feedback function to the output of the second means and combining it with the previously stored signals from the fourth means.

7. The feedback loop system of claim 5 including means for modifying the amplitude of the output signals from the second means by the previously stored signals from the fourth means.

8. The feedback loop system of claim 7 including means for providing the previously stored signals from the fourth means to include an absolute value of the output signal from the second means.

9. The feedback loop system of claim 7 including means for providing the previously stored signals from the fourth means to include an absolute value of the slope of the output from the third means.

10. The feedback loop system of claim 1 including means for controlling the tip to have a constant relative vertical position.

11. The feedback loop system of claim 10 including means for providing the constant relative vertical position to be a particular distance between the tip and surface.

12. A feedback control system for enhancing the feedback loop characteristics of a vertical axis control in a scanning tunneling microscope or the like, including a tip member for positioning relative to the surface of a sample for measuring the topography of the surface of the sample, a horizontal control coupled to the tip or sample for providing a plurality of adjacent horizontal scans across the surface, a vertical control coupled to the tip or sample for providing a vertical control of the tip or sample during the plurality of adjacent horizontal scans, a local error signal produced in accordance with the vertical position of the tip relative to the surface in real time during the plurality of adjacent horizontal scans, a storage member for storing one or both of a signal representing the surface topography and the local error signal, for producing delayed versions of the stored signals, and a vertical control signal coupled to the vertical control and formed by combining the local error signal and the delayed signal for enhancing the control of the vertical position of the tip or sample.

13. The feedback control system of claim 12 wherein the horizontal control includes means for providing the plurality of adjacent horizontal scans to form a frame and means for providing a plurality of such frames successively and means for forming the control signal by combining the local error signal and the delayed signal from the same frame.

14. The feedback control system of claim 12 including means for delaying the delayed error signal one horizontal scan relative to the local error signal.

15. The feedback control system of claim 12 wherein the horizontal control includes means for providing the plurality of adjacent horizontal scans to form a frame and means for providing a plurality of such frames successively and means for forming the control signal by combining the local error signal and the delayed signal from different frames.

16. The feedback control system of claim 12 including means for combining the delayed signal with the local error signal to anticipate the topography of the surface as the control signal controls the vertical position of the tip or sample.

17. The feedback control system of claim 16 including means for modifying the amplitude of the local error signal by the delayed signal.

18. The feedback control system of claim 17 including means for providing the delayed signal to be one or both of a delayed local error signal and a delayed vertical control signal.

19. The feedback control system of claim 17 including means for providing the delayed signal to be an absolute value of the delayed local error signal.

20. The feedback control system of claim 17 including means for providing the delayed signal to be an absolute value of the slope of the vertical control signal.

21. The feedback control system of claim 12 including means for controlling the vertical positions of the tip or sample by the control signal to be constant relative to the surface.

22. The feedback control system of claim 21 including means for providing the constant relative position to be a predetermined position to provide for an optimal operation of the scanning tunneling microscope or the like.

23. A method of controlling the relative vertical position of a tip to a surface of a sample and with the tip or sample scanned in a horizontal plane relative to the surface to measure the topography of the surface, including the following steps scanning the tip or sample relative to the surface in a horizontal plane along a plurality of adjacent scanning lines, producing output signals in accordance with the relative vertical position between the tip and the surface at individual positions along the plurality of adjacent scanning lines, producing control signals representing the relative vertical position of the tip or sample at individual positions, storing one or both of the output signals and control signals at the individual positions for later retrieval of the previously stored signals, and controlling the tip or sample in accordance with the control signals and one or more of the previously stored signals to a predetermined relative vertical position.

24. The method of claim 23 wherein the scanning along the plurality of adjacent scan lines produces a succession of frames of the topography of the surface and with the control signals formed by the output signals and the previously stored signals from the same frame.

25. The method of claim 24 wherein the control signals are formed by the output signals at the individual positions along each adjacent scan line and the previously stored signals at the individual positions from the prior adjacent scan line.

26. The method of claim 23 wherein the scanning along the plurality of adjacent scanning lines produces a succession of frames of the topography of the surface and with the control signals formed by the output signals from one frame and the previously stored signals from a previous frame.

27. The method of claim 23 wherein the previously stored signals modify the output signals to anticipate the topography of the surface to enhance the control of the tip or sample by the control signals to the predetermined vertical position.

28. The method of claim 27 wherein the previously stored signals modify the amplitude of the output signals.

29. The method of claim 28 wherein the previously stored signals include an absolute value of the output signals.

30. The method of claim 28 wherein the previously stored signals include an absolute value of the slope of the control signals.

31. The method of claim 23 wherein the tip and surface are controlled to have a constant relative vertical position.

32. The method of claim 31 wherein the constant relative vertical position is a particular distance between the tip and surface.

33. A method for enhancing the feedback loop characteristics of a vertical axis control in a scanning tunneling microscope or the like, including the following steps providing a tip member for positioning relative to a surface of a sample for measuring the topography of the surface, coupling a horizontal control to the tip or sample for providing a plurality of adjacent horizontal scans across the surface, providing a vertical control to the tip or sample for the plurality of adjacent horizontal scans, providing a local error signal in accordance with the vertical position of the tip relative to the surface in real time during the plurality of adjacent horizontal scans, storing one or both of the local error signal, or a signal describing the surface topography for producing delayed versions of the stored signals, and forming a vertical control signal of combining the local error signal and the delayed signals and coupling the control signal to the vertical control for enhancing the control of the vertical position of the tip or sample.

34. The method of claim 33 wherein the horizontal control provides the plurality of adjacent horizontal scans to form a frame and with a plurality of such frames provided successively and with the control signal formed by combining the local error signal and the delayed signals from the same frame.

35. The method of claim 34 wherein the delayed signal is delayed one horizontal scan relative to the local error signal.

36. The method of claim 33 wherein the horizontal control provides the plurality of adjacent horizontal scans to form a frame and with a plurality of such frames provided successively and with the control signal formed by combining the local error signal and the delayed signal from different frames.

37. The method of claim 33 wherein the delayed signals are combined with the local error signal to anticipate the topography of the surface as the control signal controls the vertical position of the tip or sample.

38. The method of claim 37 wherein the delayed signal is one or both of the delayed local error signal and the delayed vertical control signal.

39. The method of claim 37 wherein the delayed signals modify the amplitude of the local error signal.

40. The method of claim 39 wherein the delayed signal is an absolute value of the delayed local error signal.

41. The method of claim 39 wherein the delayed signal is an absolute value of the slope of the delayed vertical control signal.

42. The method of claim 33 wherein the control signal controls the vertical position of the tip or sample to be constant relative to the surface.

43. The method of claim 42 wherein the constant relative position is a predetermined position to provide for a optimal operation of the scanning tunneling microscope or the like.

*44. A microscope comprising:*

*a probe with a sensing tip to probe a sample;*

*scanning means for creating relative movement between the sample and the sensing tip;*

*sensing means for sensing the position of the sensing tip; and*

*feedback means connected between the sensing means and the scanning means for maintaining the tip in a pre-established relationship with respect to a scanned surface of the sample in a vertical direction to obtain height information about the scanned surface of the sample, said feedback means comprising,*

*analog-to-digital conversion means for obtaining an analog signal from the sensing means and for converting said analog signal into a digital signal,*

*digital computation means including program means for receiving said digital signal from said analog-to-digital conversion means and for calculating and outputting digital vertical control signals which create desired relative movement between the sample and the sensing tip in the vertical direction to maintain the tip in the pre-established relationship with respect to the scanned surface of the sample in the vertical direction, and*

*digital-to-analog conversion means for receiving said digital vertical control signals from said digital computation means and for outputting analog control signals to the scanning means to affect movement thereof in the vertical direction.*

*45. The microscope according to claim 44, wherein said digital computation means of said feedback means comprises:*

*means for producing said vertical control signals based at least in part on the vertical position of said tip in a previous line scan of said sample by said tip.*

*46. The microscope according to claim 44, wherein said digital computation means of said feedback means comprises:* means for producing said digital vertical control signals based at least in part on a gain term derived at least in part on the vertical position of said tip in a previous line scan of said sample by said tip.

*47. The microscope according to claim 44, wherein said sensing means comprises:*

*means for sensing a tunneling current flow between said tip and said sample.*

*48. The microscope according to claim 45, wherein said sensing means comprises:*

*means for sensing a tunneling current flow between said tip and said sample.*

*49. The microscope according to claim 46, wherein said sensing means comprises:*

*means for sensing a tunneling current flow between said tip and said sample.*

*50. The microscope according to claim 44, wherein said sensing means comprises:*

*means for sensing the force interaction of said tip with said surface.*

*51. The microscope according to claim 45, wherein said sensing means comprises:*

*means for sensing the force interaction of said tip with said surface.*

*52. The microscope according to claim 46, wherein said sensing means comprises:*

*means for sensing the force interaction of said tip with said surface.*

* * * * *